United States Patent
Minemura et al.

(10) Patent No.: US 8,085,641 B2
(45) Date of Patent: Dec. 27, 2011

(54) REPRODUCED SIGNAL EVALUATION METHOD AND WRITE ADJUSTMENT METHOD

(75) Inventors: Hiroyuki Minemura, Kokubunji (JP); Takahiro Kurokawa, Fujisawa (JP); Junya Shiraishi, Nagano (JP); Shoei Kobayashi, Kanagawa (JP); Harumitsu Miyashita, Nara (JP); Yasumori Hino, Nara (JP)

(73) Assignees: Hitachi Consumer Electronics Co., Ltd., Tokyo (JP); Sony Corporation, Tokyo (JP); Panasonic Corporation, Osaka (JP)

( * ) Notice: Subject to any disclaimer, the term of this patent is extended or adjusted under 35 U.S.C. 154(b) by 0 days.

(21) Appl. No.: 12/836,743

(22) Filed: Jul. 15, 2010

(65) Prior Publication Data

US 2011/0026383 A1    Feb. 3, 2011

(30) Foreign Application Priority Data

Jul. 15, 2009    (JP) ................................. 2009-167198

(51) Int. Cl.
*G11B 7/00* (2006.01)
(52) U.S. Cl. ................................. 369/59.22; 369/59.12
(58) Field of Classification Search ............... 369/59.12, 369/59.22
See application file for complete search history.

(56) References Cited

U.S. PATENT DOCUMENTS

| 7,869,327 B2* | 1/2011 | Miyashita et al. ......... 369/53.35 |
| 2003/0067998 A1 | 4/2003 | Nakajima et al. |
| 2003/0090980 A1 | 5/2003 | Kashihara et al. |
| 2005/0249318 A1 | 11/2005 | Minemura |
| 2007/0234188 A1 | 10/2007 | Shiraishi |
| 2010/0260025 A1* | 10/2010 | Minemura et al. ......... 369/59.22 |

FOREIGN PATENT DOCUMENTS

| EP | 1 575 176 | 9/2005 |
| EP | 2 242 053 | 10/2010 |
| EP | 2 249 343 | 11/2010 |
| JP | 2003-141823 | 5/2003 |
| JP | 2003-151219 | 5/2003 |
| JP | 2005-196964 | 7/2005 |
| JP | 2005-346897 | 12/2005 |

OTHER PUBLICATIONS

U.S. Appl. No. 12/568,977, Sep. 29, 2009, Minemura et al.
U.S. Appl. No. 12/569,021, Sep. 29, 2009, Minemura et al.
Harumitsu Miyashita et al.; Signal Qualification Method for Partial-Response Maximum-Likelihood Read/Write Channel, Japanese Journal of Applied Physics, 2004, pp. 4850-4851, vol. 43, No. 7B.
Shiraishi, J. et al "Signal quality evaluation method for over-30-GB Blu-ray discs", Japanese Journal of Applied Physics, Part 1, Japan Soc. Appl. Phys. Japan, vol. 45, No. 28 Feb. 2006, pp. 1066-1070.

* cited by examiner

*Primary Examiner* — Latanya Bibbins
(74) *Attorney, Agent, or Firm* — Antonelli, Terry, Stout & Kraus, LLP.

(57) ABSTRACT

The present invention aims to provide a reproduced signal evaluation method and a write adjustment method for offering a Blu-ray disc having a large storage capacity with excellent media compatibility. An evaluation index L-SEAT is calculated through signed addition using a Euclidean distance difference calculated from at least one of target signals in which a focused edge is shifted to the right and left, and the quality of the reproduced signal is evaluated based on the evaluation index. Write condition adjustment using the index enables write adjustment not depending on SNR and achieving high adjustment accuracy.

4 Claims, 9 Drawing Sheets

| No. | Discriminator Bit Array | L-Target | R-Target |
|-----|-------------------------|----------|----------|
|     |                         | XOR Mask Bit Array | XOR Mask Bit Array |
| 1   | 000111                  | 001000   | 000100   |
| 2   | 111000                  |          |          |
| 3   | 000110                  | 001000   | -        |
| 4   | 111001                  |          |          |
| 5   | 100111                  | -        | 000100   |
| 6   | 011000                  |          |          |
| 7   | 1110011000              | 0010100000 | 0000010100 |
| 8   | 0001100111              |          |          |

FIG. 4A

Tsfp(2s,2m) Edge Shift = 0.0T

FIG. 4B

Tsfp(2s,2m) Edge Shift = +0.2T

FIG. 5A

Tsfp(2s,2m) Edge Shift = 0.0T

FIG. 5B

Tsfp(2s,2m) Edge Shift = +0.2T

FIR coefficients for symmetric equalization without equivalent group delay:

REPRODUCED SIGNAL EVALUATION METHOD AND WRITE ADJUSTMENT METHOD

CLAIM OF PRIORITY

The present application claims priority from Japanese patent application JP 2009-167198 filed on Jul. 15, 2009, the content of which is hereby incorporated by reference into this application.

BACKGROUND OF THE INVENTION

1. Field of the Invention

The present invention relates to a reproduced signal evaluation method for an optical disc medium in which recording marks having physical properties different from other portions are formed on a recording medium to store information, and a write adjustment method of adjusting conditions for writing information.

2. Description of the Related Art

A technology for binarizing a reproduced signal with an adaptive equalization technique and a PRML (Partial Response Maximum Likelihood) technique has been becoming essential along with the emergence of optical discs with higher speed and higher density. The densification of an optical disc makes recording marks small in size relative to an optical spot, and accordingly reduces the amplitude of a reproduced signal obtained therefrom. The resolution of an optical spot is determined by a wavelength λ and the numerical aperture NA of an objective lens. When the length of a recording mark of a minimum run length is λ/4 NA or less, the amplitude of repetitive signals reproduced therefrom is zero. This is a phenomenon generally known as an optical cut-off effect. In the case of a Blu-ray Disc (hereinafter, BD), λ/4 NA≈119 nm. If the BD is designed to have a storage capacity of approximately 31 GB or more with a track pitch set constant, repetitive signals of 2T, which is the minimum run length, have an amplitude of zero. Thus, the adaptive equalization technique and the PRML technique need to be used to obtain good reproduction performance of an optical disc under such high density conditions.

As for a write-type optical disc, a laser beam intensity-modulated in a pulse shape (hereinafter, referred to as write pulses) is used to change a crystalline state or the like of a recording film, thereby recording desired information on the disc. The recording film is a widely known film made of a material such as a phase change material, an organic dye, or a certain type of alloy or oxide. In a mark edge code scheme used in the BD, code information is determined by the positions of front and ending edges. Among the write pulses, a first pulse, a last pulse and a cooling pulse are important in terms of their positions and widths to maintain the quality of recorded information in good condition. Here, a condition of forming the leading edge of the recording mark is determined mainly based on the first pulse, and a condition of forming the ending edge of the recording mark is determined mainly based on the last pulse. Therefore, write pulses generally used for the write-type optical disc are adaptive write pulses in which the first pulse, the last pulse and the cooling pulse are adaptively changed in position or width depending on the length of a recording mark and the length of its preceding or following space.

Since finer recording marks are formed under the high density conditions described above, irradiation conditions for write pulses (hereinafter, referred to as write conditions) need to be determined with higher accuracy than ever before.

Meanwhile, the shape of the optical spot produced by an optical disc device varies depending on factors such as a wavelength, wave aberration and focus conditions of a light source, and tilt of a disc. In addition, since the impedance and quantum efficiency of a semiconductor laser device vary according to an ambient temperature and with aged deterioration, the shapes of write pulses also vary. Trial writing is a general term indicating an adjustment technique for always obtaining the optimum write conditions according to the shape of the optical spot and the shapes of the write pulses, both of which vary depending on individual devices or discs and environments, as described above. With an increase in recording density, greater importance is placed on the write adjustment technique.

As a method of statistically evaluating the quality of recorded data, which is applicable to the PRML technique, there are methods described in Non-Patent Document 1 "Jpn. J. Appl. Phys., Vol. 43, pp. 4850 (2004)," Patent Document 1 "JP 2003-141823 A," Patent Document 2 "JP 2005-346897 A," and Patent Document 3 "JP 2003-151219 A." In addition, the technique described in Document 4 "JP 2005-196964 A" provides an evaluation index of the quality of a reproduced signal, which is applicable to the PR(1,2,2,2,1)ML technique.

In Non-Patent Document 1 "Jpn. J. Appl. Phys., Vol. 43, pp. 4850 (2004)," a maximum likelihood sequence error (MLSE) is defined by using a reproduced signal and two target signals. Specifically, a first one of the target signals is a first binary bit array (equivalent to the most likely state transition sequence) obtained from the reproduced signal, whereas a second target signal is a second binary bit array (equivalent to the second most likely state transition sequence) in which a focused edge in the first binary bit array is shifted by one bit. A first Euclidean distance (equivalent to Pa) between a reproduced signal and the first target signal and a second Euclidean distance (equivalent to Pb) between the reproduced signal and the second target signal are obtained. The MLSE is defined as a value obtained by subtracting a Euclidean distance between the two target signals from the absolute value of a difference between the first Euclidean distance and the second Euclidean distance. Then, the write conditions are adjusted so that the mean value of the distribution of MLSE can be zero for each write pattern.

Patent Document 1 "JP 2003-141823 A" discloses a technique of evaluating the quality of a reproduced signal on the basis of the distribution of |Pa−Pb| where Pa denotes a likelihood of the most likely state transition sequence, and Pb denotes a likelihood of the second most likely state transition sequence.

Patent Document 2 "JP 2005-346897 A" focuses attention on an edge shift, and discloses a technique of adjusting write conditions. In this technique, a pattern including a virtual 1T run length is generated as an error pattern in which an edge in the reproduced signal is shifted to the right or left, and a sequence error difference with a sign depending on an edge shift direction is calculated by using the error pattern. Then, an edge shift amount is calculated based on the calculated signed-difference, and the write conditions are adjusted so that the edge shift amount can be as close to zero as possible. This evaluation index is called V-SEAT (Virtual state based Sequence Error for Adaptive Target).

In the technique disclosed by Patent Document 3 "JP 2003-151219 A," an error probability that a focused edge is shifted to the left and an error probability that the focused edge is shifted to the right are calculated on the basis of Euclidean distances between a reproduced signal and both of a correct pattern and an error pattern, and then write conditions are adjusted so that the two error probabilities can be equal to each other. Accordingly, this technique uses a predetermined reproduced signal, a first pattern corresponding to a signal waveform pattern of the reproduced signal, and another certain pattern (a second or third pattern) being different from the first pattern but also corresponding to the signal waveform pattern of the reproduced signal. Firstly, calculation is made to obtain a distance difference D=Ee–Eo between a distance Eo between the reproduced signal and the first pattern, and a distance Ee between the reproduced signal and the certain pattern. Then, the distribution of the distance differences D is obtained from multiple samples of reproduced signals. Thereafter, a quality evaluation parameter (M/σ) of the reproduced signal is determined on the basis of a ratio of the mean value M of the obtained distance differences D to the standard deviation a of the obtained distribution of the distance differences D. Then, the quality of the reproduced signal is judged based on an evaluation index value (Mgn) represented by the quality evaluation parameter.

Patent Document 4 "JP 2005-196964 A" discloses a technique using a table in which pairs of correct patterns and corresponding error patterns are stored in advance, calculating a difference between a Euclidean distance between a reproduced signal and each correct pattern and a Euclidean distance between the reproduced signal and the corresponding error pattern, and obtaining a simulated bit error rate (SbER) from the mean value and the standard deviation of the calculated differences.

Patent Document 1: JP 2003-141823 A
Patent Document 2: JP 2005-346897 A
Patent Document 3: JP 2003-151219 A
Patent Document 4: JP 2005-196964 A
Non-Patent Document 1: Jpn. J. Appl. Phys., Vol. 43, pp. 4850 (2004).

SUMMARY OF THE INVENTION

The most likely state transition sequence and the second most likely state transition sequence described in Patent Document 1 are the same as the correct pattern and the error pattern described in Patent Document 3 in the sense that these are target bit arrays from each of which the distance to the reproduced signal is to be measured. Patent Document 2 and Patent Document 3 use three types of target bit arrays, but these bit arrays have the same meanings, respectively. Hereinafter, these bit arrays are collectively called evaluation bit arrays. In addition, since the present invention aims to achieve a large capacity of 30 GB or more based on a BD system, the following description will be provided on the assumption that the minimum run length of modulation code is 2T.

As described in Non-Patent Document 1, the PRML technique using a constraint length of 5 or more is suitable to achieve high density recording. When the recording density in BPI (bits per inch) is increased under the BD optical system conditions (the wavelength is 405 nm, and the numerical aperture of the objective lens is 0.85), the amplitude of the 2T repetitive signals is zero for an optical disc with a capacity of approximately 31 GB or more, as described above. It is a well known fact that a method such as the PR(1,2,2,2,1)ML technique in which the target amplitude of the 2T repetitive signals is zero is suitable as the PRML technique for dealing with the above case. One of the reproduced signal evaluation methods applicable to the PR(1,2,2,2,1)ML technique is the SbER disclosed in Patent Document 4. Estimation of the SbER uses a binary bit array (correct pattern) and also bit arrays, as second maximum likelihood evaluation bit arrays (error patterns), having a Hamming distance of 1 (edge shift), a Hamming distance of 2 (2T data shift), and a Hamming distance of 3 (2T-2T data shift) from the correct pattern. The error bit rate is estimated by using an error function with the mean values and the standard deviations of the distributions of these patterns while the distributions are regarded as the Gaussian distribution.

The following shows performance requirements that are to be achieved by the technique of adjusting write conditions with accuracy high enough to produce an optical disc system achieving a storage capacity of 30 GB or more based on the BD standards. Specifically, these requirements include at least the following two points to be satisfied by at least the quality of data recorded under the adjusted conditions:

(1) an error rate such as SbER or bit error rate is sufficiently low; and (2) an error rate such as SbER or bit error rate of data recorded by a certain drive device is sufficiently low also in another drive device.

Hereinafter, description will be provided for technical problems conceivable from the conventional techniques and their combinations in view of the above two performance requirements.

In the first place, a problem that an increase of recording density poses on the distributions of the Euclidean distance differences is described. The Euclidean distance difference mentioned here is a value obtained by subtracting the Euclidean distance between the reproduced signal and the correct target signal, from the Euclidean distance between the reproduced signal and the error target signal, and is defined as |Pa−Pb| in Patent Document 1 and as the D value in Patent Documents 3 and 4.

Figure 2:
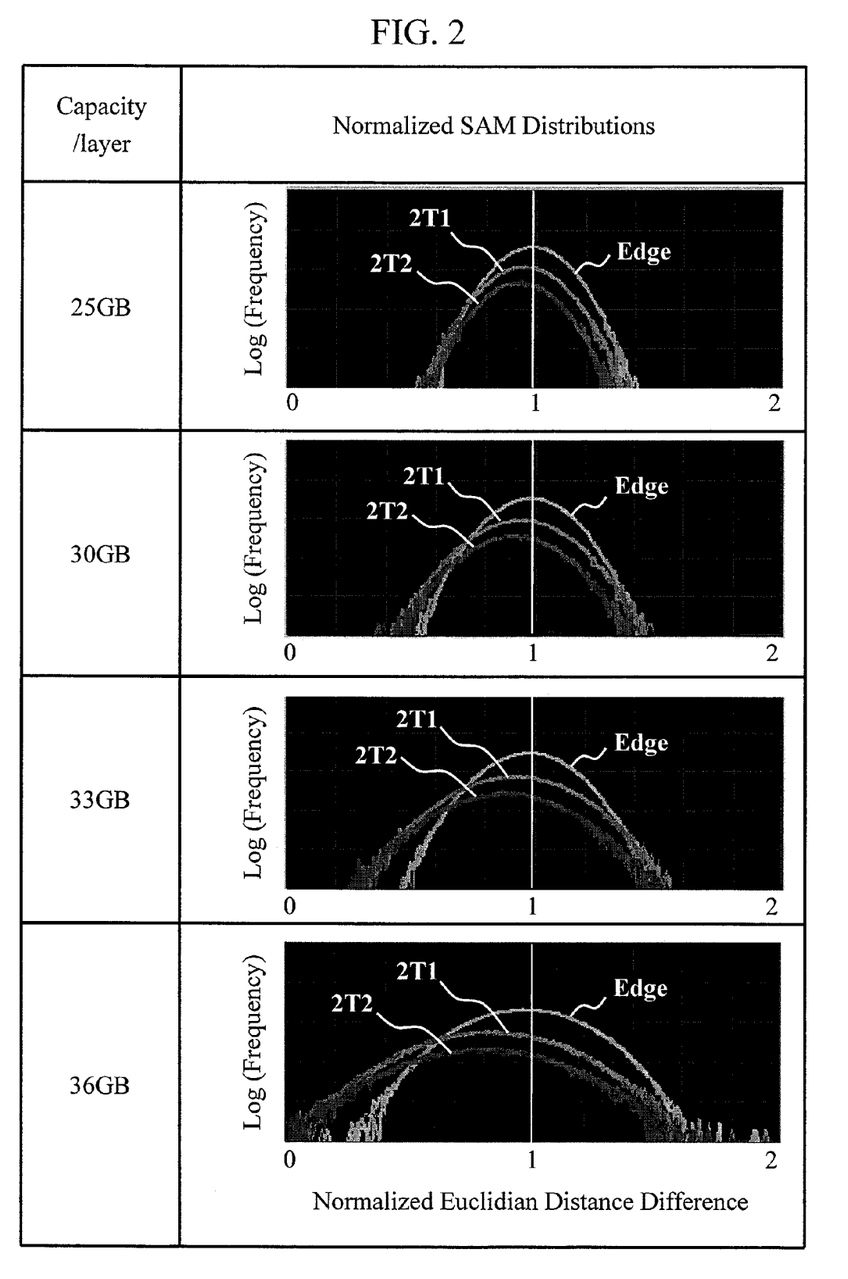
FIG. 2 is a diagram showing a relationship between a storage capacity and distributions of Euclidean distance differences.

A simulation is performed to consider an ideal write state. Under conditions in which the recording density is changed within a range (T=74.5 nm to 51.7 nm) equivalent to a range from 25 GB/layer to 36 GB/layer with SNR set to 24 dB, the distributions of the Euclidean distance differences are obtained with respect to bit arrays having two or less sequential 2T shifts (Hamming distance of 3 or less). A reproduced signal processing system has a configuration described above. FIG. 2 shows the result of the simulation. These distributions are also called SAM distributions. In the PR(1,2,2,2,1)ML technique, the ideal Euclidean distance of an edge shift (Hamming distance of 1) is 14 and the ideal Euclidean distance of a 2T shift (Hamming distance of 2) and two sequential 2T shifts (Hamming distance of 3) is 12, as described above. Since these ideal Euclidean distances are thus different, the Euclidean distance differences are normalized by being divided by their corresponding ideal Euclidean distances, respectively, to show these three distributions collectively. In FIG. 2, a statistical probability at a point where the distance difference becomes zero (left-side edge) or negative is equivalent to a bit error rate. As shown in FIG. 2, it is obvious that, along with an increase in the recording density, the distributions become more widely spread even in writing under the same SNR. This shows that the error rate increases in proportion to an increase in the recording density. On the other hand, as for the mean value (approximately equal to the peak value) of each of the distributions, the edge shifts have peak values constant around 1 (=ideal Euclidean distance). However, in the case where 2T shift occurs once or sequentially, the peak values are apparently shifted toward zero along with an increase in the number of sequential 2T shifts from one to two, and also along with an increase in the recording density. A factor of causing this phenomenon is considered to be the processing capability of an adaptive equalizer. Additionally, it should be noted that the aforementioned publicly-known documents do not include any description on this phenomenon.

Here, the technical problems conceivable from the conventional techniques and their combinations in view of the above two performance requirements are summarized.

The techniques described in Non-Patent Document 1, Patent Document 1 and Patent Document 2 are designed by focusing attention only on the edge shift of the ideal Euclidean distance=14. Under the high density conditions, however, the distribution in the case of 2T shift (the Hamming distance is 2 or more) is more widely spread than the distribution in the case of edge shift, as shown in FIG. 2. Thus, the 2T shift is not negligible in write adjustment. For this reason, from the viewpoint of the performance requirement (1), these conventional techniques are obviously insufficient as a write adjustment method under high density conditions.

In the technique described in Patent Document 3, the error bit arrays are selected to satisfy the run length limitation. Thus, this is an advantageous method being effective in the correlation between the evaluation index value and SbER (or the bit error rate) not only for the case where an edge shift occurs, but also for the case where 2T shifts occur sequentially. However, this technique adjusts write conditions so that the statistical error rates of right and left shifts of a focused edge can be equal to each other, and has the following problem. Specifically, having different Hamming distances of the right and left edge shifts, the evaluation bit arrays are differently influenced by SNR. Due to such difference, different drive devices obtain different results of write adjustment. Thus, this technique is apparently insufficient in terms of the aforementioned performance requirement (2).

For the write condition adjustment for write conditions with high density of achieving a storage capacity of 30 GB/layer or more based on the BD system, the conventional techniques have a problem of being insufficient to achieve both of the high adjustment performance and the provision of compatibility, as described above. An objective to be achieved by the present invention is to provide a new reproduced signal evaluation method that solves the above problems and a write adjustment method based on the reproduced signal evaluation method.

The present invention aims to achieve a large capacity of 30 GB or more based on the BD system, and therefore the following description will be provided on the assumption that the minimum run length of modulation code is 2T. In addition, as an experimental result shows, the SbER preferably matches with a bit error rate in the case of handling evaluation bit arrays with two or less sequential 2T shifts. Thus, an evaluation index for write adjustment according to the present invention will be described on the assumption that the evaluation index of quality of a recorded signal is SbER.

A concept of the present invention is to evaluate the quality of a reproduced signal in such a way that evaluation indices based on the differences between the Euclidean distances of the reproduced signal from two target signals are separated into a component corresponding to a shift of a focused edge and a component depending on SNR. Here, description will be provided firstly for defining the evaluation indices that satisfy the above objective, and then, for presenting the evidence that the evaluation indices achieve the objective.

Hereinafter, W denotes a reproduced signal; T denotes a target signal of a binary bit array (maximum likelihood bit array) obtained from the reproduced signal; L denotes a target signal of a left shift bit array in which a focused edge in the binary bit array is shifted to the left by one bit while the run length limitation is satisfied; and R denotes a target signal of a right shift bit array in which the focused edge in the binary bit array is shifted to the right by one bit while the run length limitation is satisfied. Then, the Euclidean distances between W, T, R, L are expressed as ED (W, T), ED (W, R). In addition, xL denotes an evaluation value for an error of left shift of the focused edge, and xR denotes an evaluation value for an error of right shift of the focused edge. These evaluation values are called equivalent edge shifts and defined as:

$$xL = \frac{1}{2}\left(1 - \frac{ED(L, W) - ED(T, W)}{ED(T, L)}\right) \qquad (D1)$$

$$xR = \frac{1}{2}\left(1 - \frac{ED(R, W) - ED(T, W)}{ED(T, R)}\right). \qquad (D2)$$

In the case where both types of shift bit arrays are present, the edge shift is defined as:

$$D = \frac{xR - xL}{2}. \qquad (D3\text{-}1)$$

Moreover, in the case where only the left shift bit array is present, the edge shift is defined as:

$$D = -xL \qquad (D\ 3\text{-}2)$$

Additionally, in the case where only the right shift bit array is present, the edge shift is defined as:

$$D = +xR \qquad (D\ 3\text{-}3)$$

For a group of edges having the same mark length and the same space length of a preceding or following space, as the focused edge, in other words, a group of edges written under the same write pulse conditions as the focused edge, a statistical mean value Δ of D that is an edge shift amount to be used for write adjustment is defined as:

$$\Delta = \frac{1}{N}\sum_{n=1}^{N} D_n. \qquad (D4)$$

Here, N denotes the total number of measured edges, and $D_n$ denotes an extended edge shift of the n-th edge.

Hereinafter, the evaluation indices defined by Formulae (D1) to (D4) in the present invention are called L-SEAT (run-length-Limited Sequence Error for Adaptive Target), and the statistical mean value Δ defined in the Formula (D4) is called a L-SEAT shift. The reproduced signal evaluation method in the present invention is to evaluate the quality of a reproduced signal on the basis of L-SEAT, and the write adjustment method in the present invention is to perform writing and reproducing under different write pulse conditions, and to adjust the write pulse conditions so as to minimize the absolute value of the L-SEAT shift of the focused edge.

Under the above definitions, the variation of the edge shift evaluation result due to SNR can be suppressed by equalizing the Hamming distance between the maximum likelihood bit array and the left shift bit array and the Hamming distance between the maximum likelihood bit array and the right shift bit array to each other, based on the result shown in FIG. 2. In addition, in the case of the edge shift (Hamming distance=1), a deviation of the mean value of the edge shift distribution from the ideal Euclidean distance difference (=1) is sufficiently small, as shown in FIG. 2. For this reason, if the right and left shift bit arrays have different Hamming distances from the maximum likelihood bit array, an extended edge shift D is calculated with Formula (D3-2) or (D3-3) using only the bit arrays having the Hamming distance=1.

Figure 3:
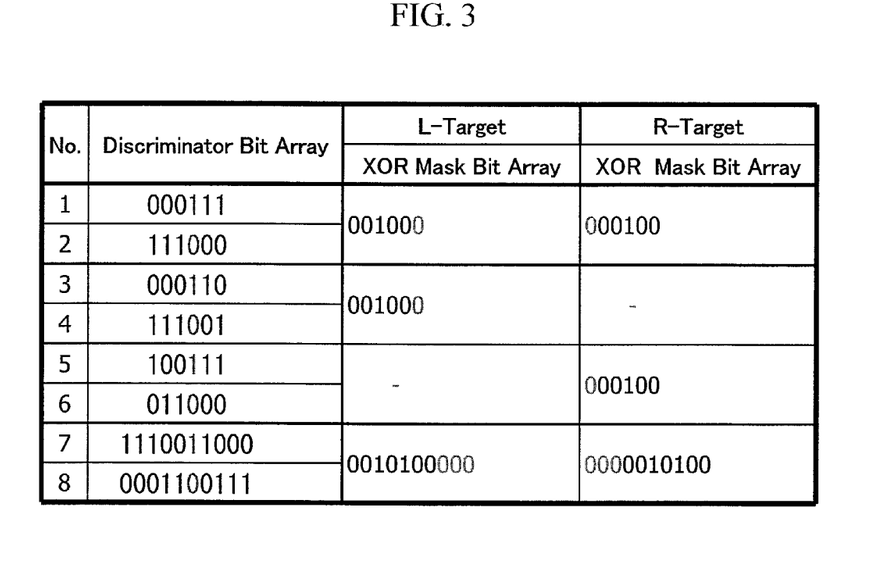
FIG. 3 is a diagram showing evaluation bit arrays.

FIG. 3 shows a summary of relationships concerning evaluation bit arrays. In the case where a binary bit array (=maximum likelihood bit array) includes a certain discriminator bit array, the left shift bit array and the right shift bit array are each generated by an exclusive OR operation of the binary bit array and a corresponding mask bit array. The mask bit array has the same length as the discriminator bit array and includes a value "1" at a position corresponding to a bit inversion. The total number of "1" included in the mask bit array indicates the Hamming distance. As shown in FIG. 3, there are eight discriminator bit arrays, and the following shows a method of generating the left shift bit array and the right shift bit array and a method of calculating the extended edge shift for each of the discriminator bit arrays.

(1) Case where the binary bit array includes a discriminator bit array "000111" or "111000"

A mask bit array "001000" is used to generate the left shift bit array, a mask bit array "000100" is used to generate the right shift bit array, and an extended edge shift is calculated according to Formula (D3-1).

(2) Case where the binary bit array includes a discriminator bit array "000110" or "111001"

A mask bit array "001000" is used to generate the left shift bit array, and an extended edge shift is calculated according to Formula (D3-2).

(3) Case where the binary bit array includes a discriminator bit array "100111" or "011000"

A mask bit array "000100" is used to generate the right shift bit array, and an extended edge shift is calculated according to Formula (D3-3).

(4) Case where the binary bit array includes a discriminator bit array "1110011000" or "0001100111"

A mask bit array "0010100000" is used to generate the left shift bit array, a mask bit array "0000010100" is used to generate the right shift bit array, and an extended edge shift is calculated according to Formula (D3-1).

Points to keep in mind for calculating Formula (D1) and Formula (D2) will be described hereinbelow briefly. These points described here are commonsense matters for general engineers who can evaluate the quality of a reproduced signal according to the PRML technique, and the detailed description thereof is omitted. On the assumption of use of the PR(1,2,2,2,1)ML technique, the bit arrays obtained by adding two bits "00," "01," "10," or "11" to either of the right and left sides of the discriminator bit array shown in FIG. 3 are needed to generate the target signals T, L, R. Nine bit arrays are obtained for one discriminator bit array under the run length limitation. For instance, for the discriminator bit array "000111," there are "0000011100," "0000011110," "0000011111," "1000011100," "1000011110," "1000011111," "1100011100," "1100011110," and "1100011111." In addition, it is effective to use only limited part of the evaluation bit array for calculating the Euclidean distances in Formula (D1) and Formula (D2). To be more precise, part in which the target signals T and L or the target signals T and R have different values can be taken from the evaluation bit array for the calculation of the Euclidean distance. For example, when the discriminator bit array "000111" is detected from a binary bit array, the Euclidean distances in Formula (D1) are calculated by using five left bits (representing 5T or 5 clock) of the discriminator bit array from the left end, and the Euclidean distances in Formula (D2) are calculated by using five right bits of the discriminator bit array from the right end. Thus, in the case where the bit arrays necessary to calculate the Euclidean distances are listed all together, the evaluation bit arrays shown in FIG. 3 are equivalent to the 54 pairs of evaluation bit arrays (108 arrays) necessary to apply the SbER described in Patent Document 4 to the PR(1,2,2,2,1)ML technique.

The following describes a result of simulation on a storage capacity of 33 GB to show effects of the present invention.

Figure 4A:
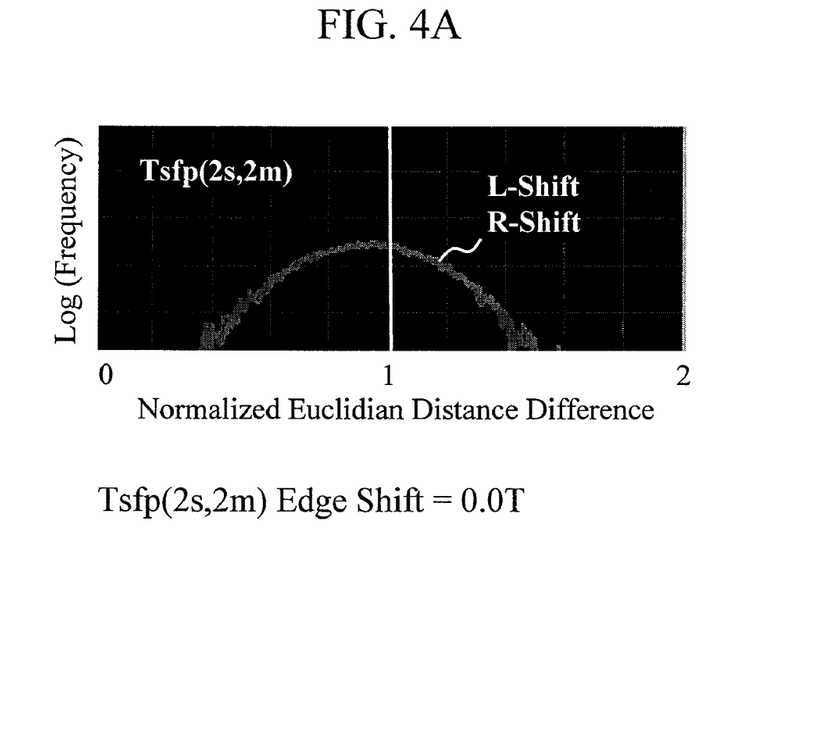
FIGS. 4A and 4B are diagrams of simulation results representing a change in SAM distribution (L, R) due to edge shift.
Figure 4B:
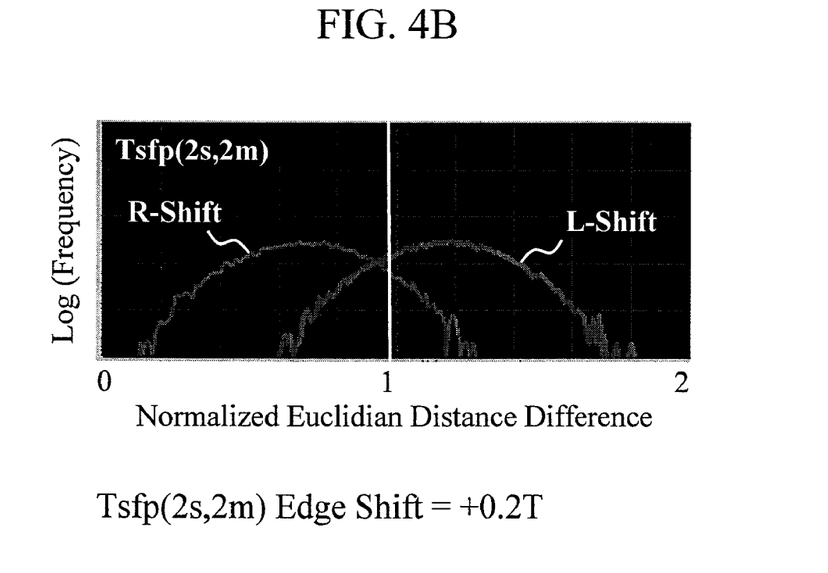

FIGS. 4A and 4B show the distribution of 2T mark having a preceding space of 2T and the SAM distribution in the result shown in FIG. 2. As shown in FIG. 4A, when the edge shift is zero, the mean values of the distributions of L shift and R shift are not equal to the ideal Euclidean distance difference (=1), but the two mean values can be regarded as the same within a tolerable error range. On the other hand, as shown in FIG. 4B, when the edge shift is not zero, the mean values of the distributions of L shift and R shift are shifted in directions reverse to one another. From this phenomenon, it was found that favorable write conditions can be obtained by adjusting parameters of the write pulses so that the mean values of the distributions of the L shift and the R shift can be equal to each other. Since the edge shift is evaluated with the signs assigned to the L shift and R shift, the condition for satisfying L-SEAT shift=0 is that the mean values of the two distributions are equal to each other. Accordingly, the write adjustment can be made for the case where the mean values of the two distributions are different from the ideal value (=1).

Figure 5A:
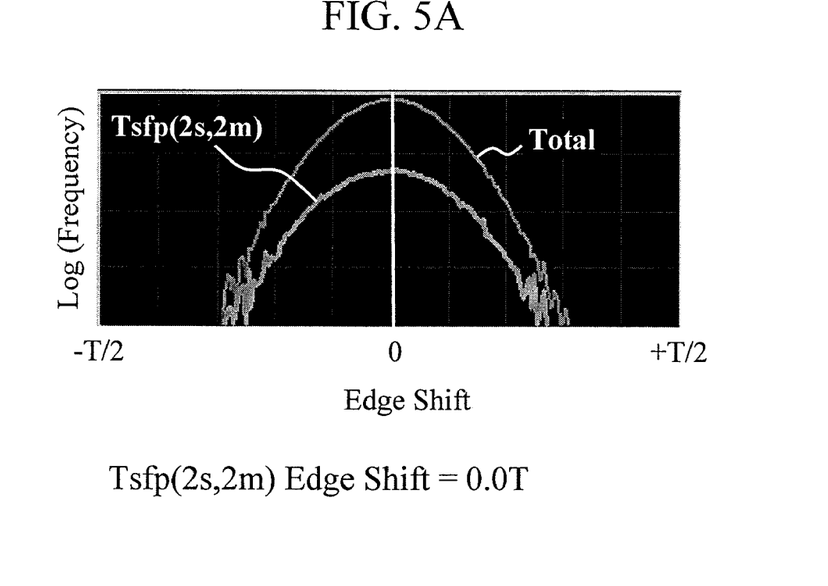
FIGS. 5A and 5B are diagrams of simulation results representing a change in L-SEAT distribution due to edge shift.
Figure 5B:
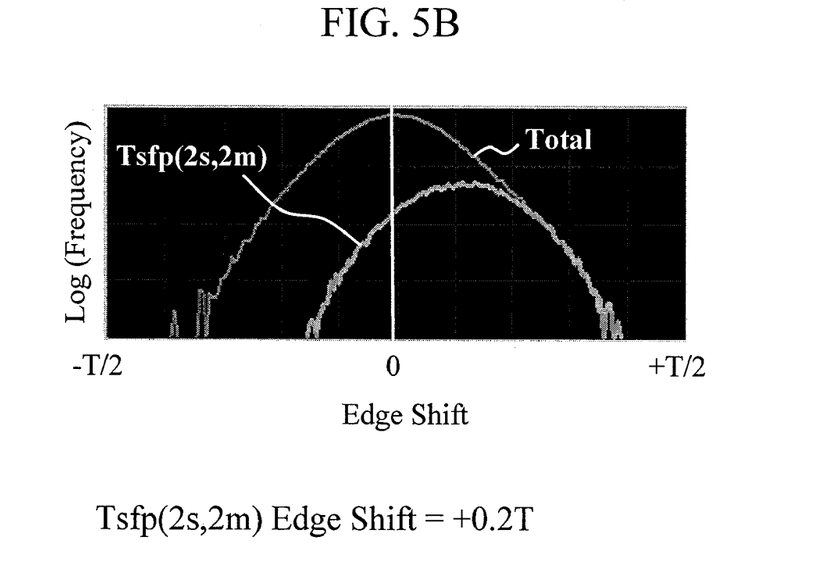

FIGS. 5A and 5B show the distributions of L-SEAT extended edge shifts obtained from the simulation shown in FIG. 4. The distribution of a focused edge is shifted in response to the edge shift in the recording mark in the simulation. This result proves that the correct evaluation can be made.

Figure 6:
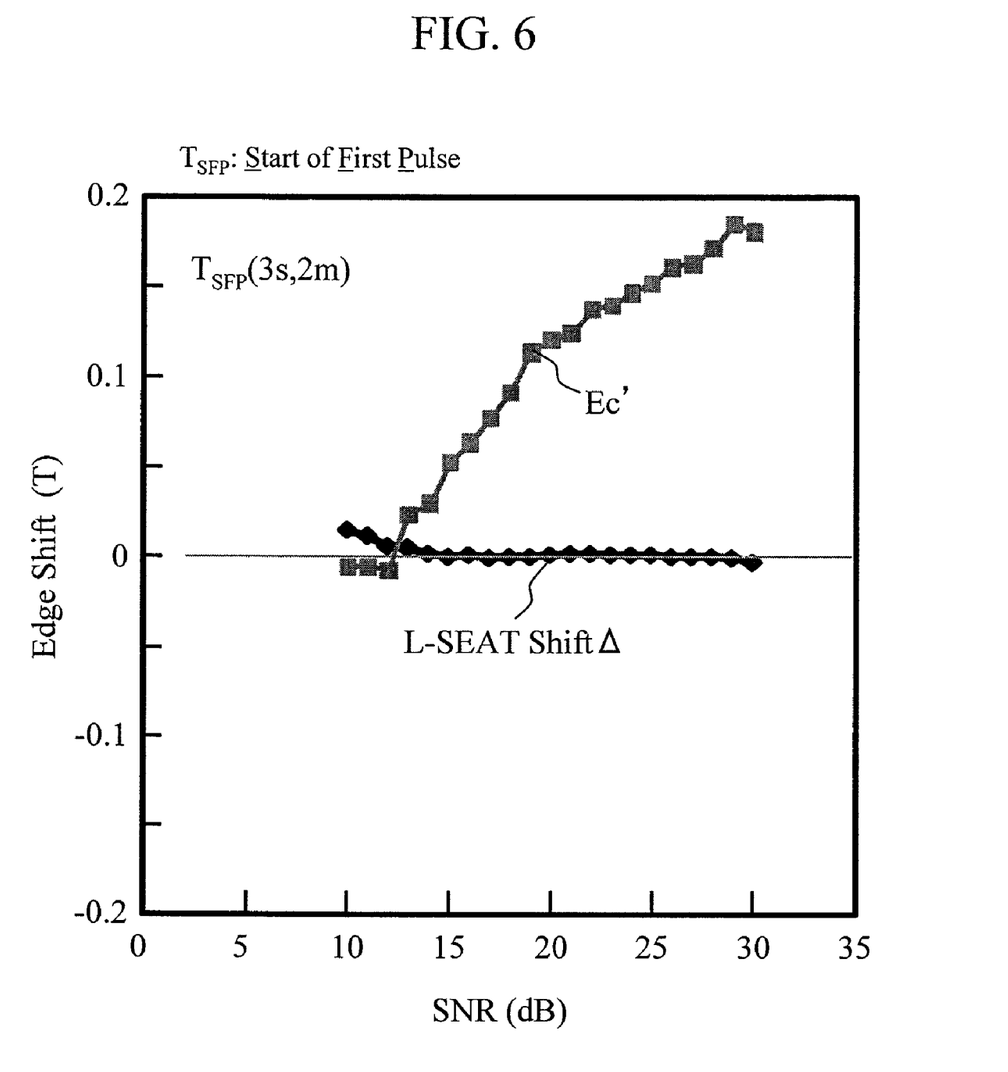
FIG. 6 is a diagram of a simulation result representing a relationship between SNR, and each of Ec' and L-SEAT shift.

FIG. 6 shows a simulation result showing variations in the evaluation results of shifts of a focused edge observed when SNR is changed. Here, FIG. 6 shows a comparison between Ec' obtained by normalizing Ec described in Patent Document 3 in units of detector window width T, and the L-SEAT shift Δ according to the present invention. The condition for a storage capacity is 33 BG. As shown in FIG. 6, the method in the present invention reduces variations in the edge shift evaluation value to a large extent in comparison with the conventional technique.

As described above, the write adjustment method in the present invention leads to the achievement of both high adjustment accuracy and compatibility in an optical disc that allows a BD system to implement recording with density high enough to obtain a storage capacity of 30 GB or more.

DESCRIPTION OF THE PREFERRED EMBODIMENTS

Hereinafter, embodiments of a reproduced signal evaluation method and a write adjustment method according to the present invention will be described with reference to the accompanying drawings.

Here, description is provided for an adaptive equalizer which is preferably used for write adjustment.

Figure 7:
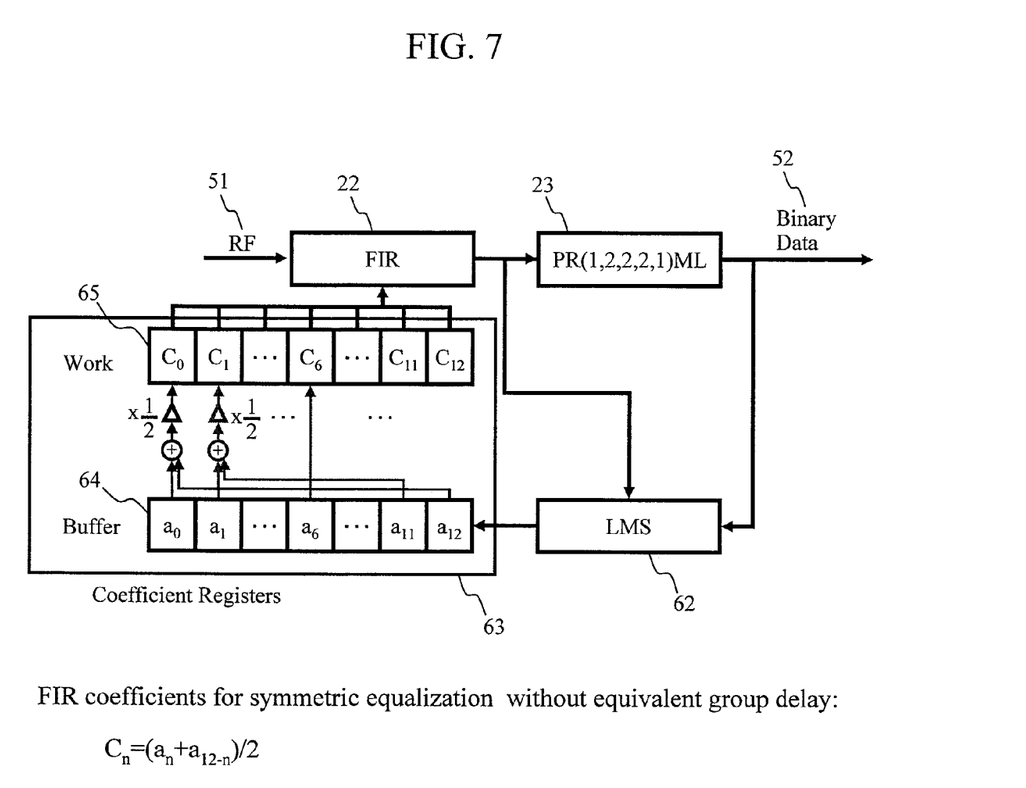
FIG. 7 is a diagram showing a configuration example of a symmetric type of automatic equalizer.

FIG. 7 is a block diagram showing a configuration example of a symmetric type of adaptive equalizer having 13 taps. In an actual drive device or evaluation device, a reproduced signal becomes asymmetric in a time axial direction due to the asymmetry in the number of taps of the adaptive equalizer. Such asymmetric distortion in the reproduced signal in the time axial direction is detected as an edge shift, and therefore may act as an obstacle to the write adjustment excellent in the compatibility for reproduction. The symmetric adaptive equalizer shown herein provides a solution to this problem. In FIG. 7, a reproduced signal reproduced from an unillustrated optical disc medium is converted into digital data by an unillustrated A/D converter. The digital data are equalized by an adaptive equalizer 22, then are binarized by a PRML decoder 23, and finally are outputted as binary bit array 52. A tap coefficient of each of the taps C0, C1, C2, . . . , is calculated, by automatic learning processing, so as to minimize a RMS error between the target signal based on the binary bit array 52 and the output signal of the adaptive equalizer. This algorithm is generally referred to as a LMS (Least Mean Square) technique and implemented by a LMS circuit 62. In this configuration, tap coefficients a0, a1, a2, . . . updated by the LMS circuit are stored once in a buffer 64, and a mean value of tap coefficients (for example, a0 and a12) at symmetric positions in the time axial direction is set in a work register 65 used in an actual operation of a FIR filter. By employing this configuration, the adaptive equalizer including the FIR filter is set to have symmetric tap coefficients, and thereby is made capable of preventing signal reproduction including asymmetric edge shifts of the recording marks.

Figure 1:
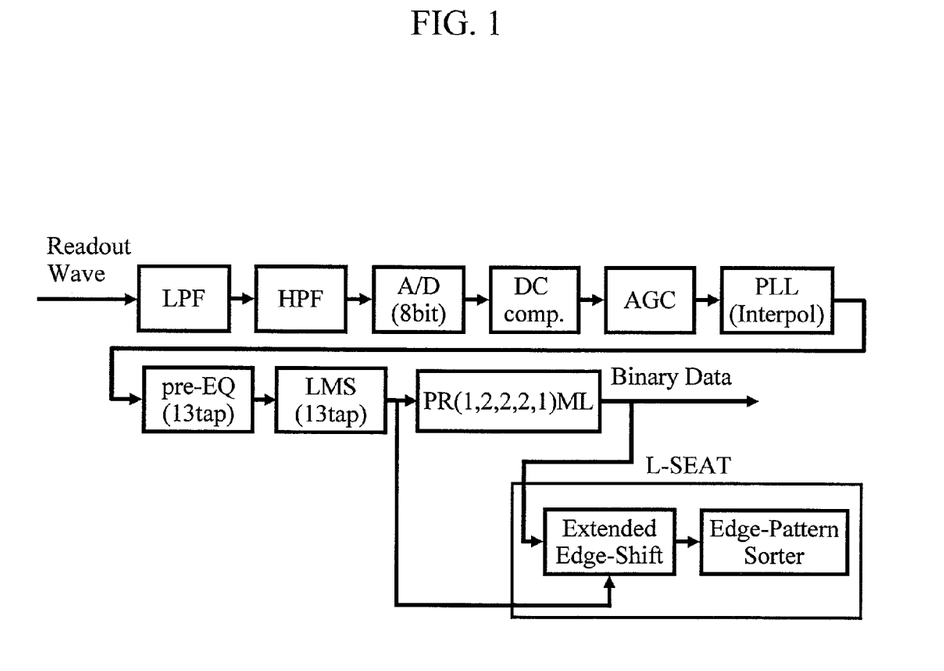
FIG. 1 is a block diagram showing a configuration example of a reproduced signal evaluation circuit.

FIG. 1 is a block diagram of a reproduced signal evaluation circuit which is preferably used to implement the write adjustment method according to the present invention. In FIG. 1, a reproduced signal obtained from an optical disc medium is transmitted to an A/D converter through a low pass filter (LPF) and a high pass filter (HPF), and is converted into digital data by the A/D converter. The digital data are transmitted to a PLL (Phase Locked Loop) block through a DC compensator (DC Comp.) and an automatic gain controller (AGC), are converted into units of data per clock cycle by the PLL block, then are equalized by a pre-equalizer (pre-EQ) and then by an adaptive equalizer (LMS), and are binarized and thus converted into a binary bit array by a PR(1,2,2,2,1) ML decoder. A L-SEAT calculation block includes an extended edge shift calculation unit and a pattern sorting unit. In the case where a binary bit array (=maximum likelihood bit array) includes a certain bit array as described above, the extended edge shift calculation unit generates at least one of the left shift bit array and the right shift bit array and calculates an extended edge shift amount of the edge. The pattern sorting unit performs statistical pattern analysis on the binary bit array and performs average processing on the binary bit array by sorting the extended edge shift values into table elements corresponding to the write pulse conditions. With this configuration, the evaluation indices for the write adjustment can be calculated while flexibly supporting various types of write strategies.

As has been described with reference to FIGS. 4 and 5, the L-SEAT shift is equivalent to a difference between the mean values of the distributions corresponding to the left shift and right shift of a focused edge in the SAM distribution. For this reason, the L-SEAT shift may be calculated from the mean values in the SAM distributions, in consideration of the number of patterns to be evaluated. In short, any one of the calculation methods can be selected depending on conditions for circuit implementation. In addition, although the L-SEAT shift is an evaluation index for edge shift, the L-SEAT shift can be used to easily obtain both of the length variation and the positional shift of a focused recording mark from evaluation results of shifts of the leading and ending edges of the focused recording mark, i.e., the difference between the evaluation results and the mean value of the evaluation results. Thus, the write conditions may be adjusted by using the shifts of the leading and ending edges of a focused recording mark, or the length and the position thereof, selectively according to the need depending on the structure of write strategies and recording characteristics of a medium.

Figure 8:
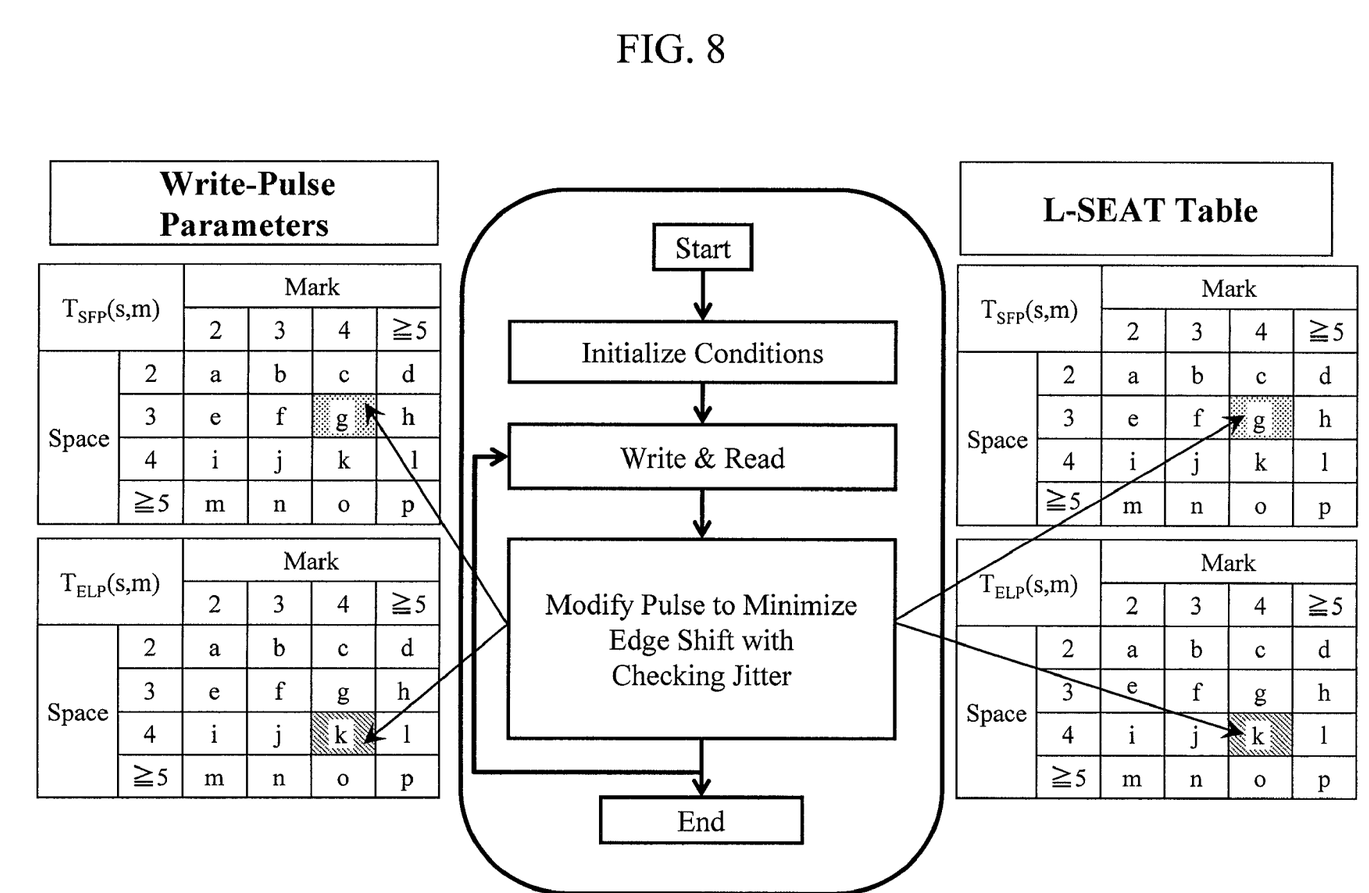
FIG. 8 is a flowchart showing a method of adjusting write pulses.

FIG. 8 is a flowchart showing an overall flow of a write pulse adjustment method. FIG. 8 shows an adjustment method based on 4×4 write strategies depending on preceding or following spaces. The measurement results of edge shifts according to L-SEAT are sorted into 4×4 tables by the reproduction system shown in FIG. 1. Here, the write strategies and the L-SEAT shift evaluation indices have a one-to-one correspondence. Data are written on an optical disc medium under different write pulse conditions, and the written data are reproduced to evaluate the values of L-SEAT shifts of each focused edge. Then, the parameters of the write pulses are modified so as to minimize the values of L-SEAT shifts. In this way, favorable conditions for the write pulses can be obtained.

Figure 9:
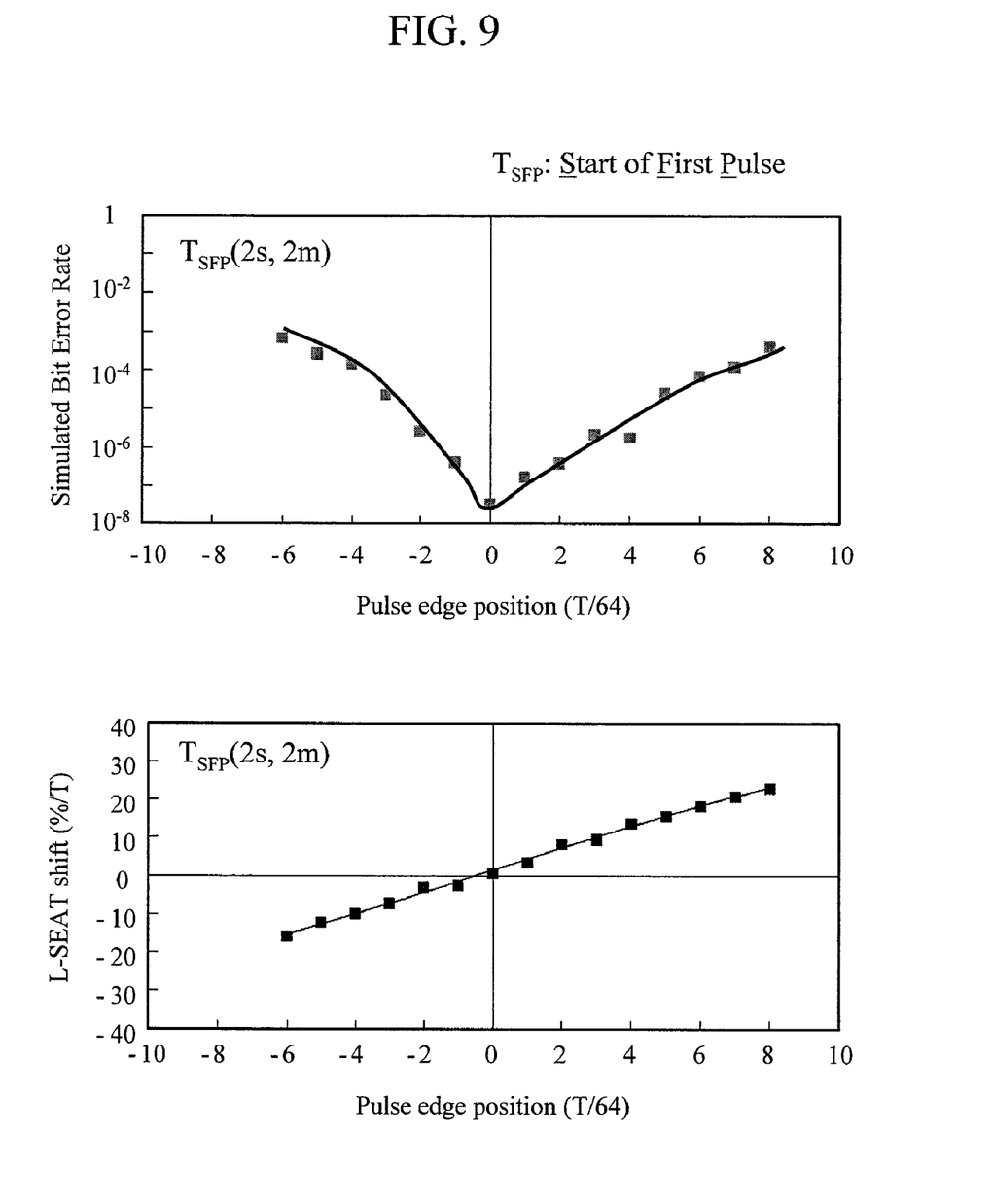
FIG. 9 is a diagram showing an experiment result of write condition adjustment using L-SEAT.

FIG. 9 shows experimental data indicating a result of adjustment of write pulse conditions using L-SEAT. In this experiment, a medium having three recording layers was produced as a prototype and used. The storage capacity is 33.3 GB/layer. FIG. 9 shows the result obtained by writing on Layer 0 (L0) in the disc by changing Tsfp (2 s, 2 m) (control parameter of a leading edge of a 2T mark after a 2T space), and then by measuring the L-SEAT shifts and the SbERs. The SbERs were measured without tap coefficients of the adaptive equalizer restricted to be symmetric, as in the case of normal reproduction. The experiment was conducted under conditions in which the unit of edge adjustment of write pulses was T/64, and in which the linear velocity of write/reproduction was set to the data transfer rate equivalent to ×2 speed of BD. As shown in FIG. 9, the zero point of the L-SEAT shift and a bottom point of SbER are coincident with each other with accuracy of a pulse width of T/64 or smaller. In general, the unit of adjustment of write pulse width is approximately T/16. Thus, these results prove that very favorable conditions are obtainable by the write condition adjustment using the L-SEAT shift and L-SEAT jitter. When the above adjustment was made for all the write pulse parameters, the SbER value was consequently improved from $3 \times 10^{-3}$ to $1 \times 10^{-7}$.

The present invention relates to a write adjustment method for an optical disc with a large storage capacity.

EXPLANATION OF REFERENCE NUMERALS

21 A/D converter
22 adaptive equalizer

23 PRML decoder
30 reproduced signal evaluation circuit
31 main bit array discriminating circuit
32 evaluation bit array generation circuit
33 Euclidean distance calculation circuit
34 write pulse corresponding pattern sorting unit
35 evaluation value summarizing circuit
51 reproduced signal
52 binary signal
53 equalized reproduced signal

What is claimed is:

1. A reproduced signal evaluation method for an optical disc on which information is written by using code with a minimum run length of 2T and from which the information is reproduced by using an adaptive equalization technique and a PR(1,2,2,2,1)ML technique, the method comprising the steps of:

using, as the adaptive equalization technique, a FIR filter with tap coefficients restricted to be centrosymmetric;

obtaining a maximum likelihood bit array in such a way that a reproduced signal obtained from the optical disc is binarized in the PR(1,2,2,2,1)ML technique;

generating at least one of a left shift bit array in which an edge of a focused recording mark in the maximum likelihood bit array is shifted to the left by 1T while limitation on a minimum run length of 2T or longer is satisfied, and a right shift bit array in which the edge of the focused recording mark in the maximum likelihood bit array is shifted to the right by 1T while the limitation on the minimum run length of 2T or longer is satisfied;

generating a target signal corresponding to at least any one of the maximum likelihood bit array, the left shift bit array and the right shift bit array; and calculating, as an evaluation index of the focused recording mark, an edge shift, a length or a position of the focused recording mark on the basis of a Euclidean distance difference between the target signal and the reproduced signal, and evaluating quality of the reproduced signal based on the evaluation index thus calculated, wherein the left shift bit array and the right shift bit array each are obtained by an exclusive OR operation of the maximum likelihood bit array and a mask bit array, and the step of generating at least one of the left shift bit array and the right shift bit array includes the steps of:

when the maximum likelihood bit array includes "000111" or "111000," generating both the left shift bit array by using a mask bit array "001000" and the right shift bit array by using a mask bit array "000100";

when the maximum likelihood bit array includes "000110" or "111001," generating the left shift bit array by using a mask bit array "001000";

when the maximum likelihood bit array includes "100111" or "011000," generating the right shift bit array by using a mask bit array "000100"; and when the maximum likelihood bit array includes "1110011000" or "0001100111," generating both the left shift bit array by using a mask bit array "0010100000" and the right shift bit array by using a mask bit array "0000010100."

2. A reproduced signal evaluation method for an optical disc on which information is written by using code with a minimum run length of 2T and from which the information is reproduced by using an adaptive equalization technique and a PR(1,2,2,2,1)ML technique, the method comprising the steps of:

using, as the adaptive equalization technique, a FIR filter with tap coefficients restricted to be centrosymmetric;

obtaining a first binary bit array in such a way that a reproduced signal obtained from the optical disc is binarized in the PR(1,2,2,2,1)ML technique;

generating a second or third binary bit array as a bit array in which an edge of a focused recording mark in the first binary bit array is shifted to the left or right by 1T while limitation on a minimum run length of 2T or longer is satisfied;

generating at least any one of first, second and third target signals corresponding to the first to third binary bit arrays;

calculating at least any one of a first Euclidean distance difference that is a difference between a Euclidean distance between the second target signal and the reproduced signal, and a Euclidean distance between the first target signal and the reproduced signal, and a second Euclidean distance difference that is a difference between a Euclidean distance between the third target signal and the reproduced signal, and the Euclidean distance between the first target signal and the reproduced signal;

calculating, as an evaluation index of the focused recording mark, an edge shift, a length or a position of the focused recording mark by using at least any one of the first Euclidean distance difference and the second Euclidean distance difference, and evaluating quality of the reproduced signal based on the evaluation index thus calculated;

when the focused recording mark is 2T and follows or is followed by a space of 2T, calculating the evaluation index based on the first and second Euclidean distance differences with both of a Hamming distance between the second and first binary bit arrays and a Hamming distance between the third and first binary bit arrays being 2;

when the focused recording mark is 3T or longer and follows or is followed by a space of 3T or longer, calculating the evaluation index based on the first and second Euclidean distance differences with both of the Hamming distance between the second and first binary bit arrays and the Hamming distance between the third and first binary bit arrays being 1; and when the focused recording mark is 2T and follows or is followed by a space of 3T or longer, calculating the evaluation index based on the first Euclidean distance difference with the Hamming distance between the second and first binary bit arrays being 1.

3. A write adjustment method for an optical disc on which information is written by using code with a minimum run length of 2T and from which the information is reproduced by using an adaptive equalization technique and a PR(1,2,2,2,1) ML technique, the method comprising the steps of:

using, as the adaptive equalization technique, a FIR filter with tap coefficients restricted to be centro symmetric;

obtaining a maximum likelihood bit array in such a way that a reproduced signal obtained from the optical disc is binarized in the PR(1,2,2,2,1)ML technique;

generating at least one of a left shift bit array in which an edge of a focused recording mark in the maximum likelihood bit array is shifted to the left by 1T while limitation on a minimum run length of 2T or longer is satisfied, and a right shift bit array in which the edge of the focused recording mark in the maximum likelihood bit array is shifted to the right by 1T while the limitation on the minimum run length of 2T or longer is satisfied;

generating a target signal corresponding to at least any one of the maximum likelihood bit array, the left shift bit array and the right shift bit array; and calculating, as an evaluation index of the focused recording mark, an edge shift, a length or a position of the focused recording mark on the basis of a Euclidean distance difference between the target signal and the reproduced signal, and adjusting a condition for writing the information based on the evaluation index thus calculated, wherein the left shift bit array and the right shift bit array each are obtained by an exclusive OR operation of the maximum likelihood bit array and a mask bit array, and the step of generating at least one of the left shift bit array and the right shift bit array includes the steps of:
when the maximum likelihood bit array includes "000111" or "111000," generating both the left shift bit array by using a mask bit array "001000" and the right shift bit array by using a mask bit array "000100";
when the maximum likelihood bit array includes "000110" or "111001," generating the left shift bit array by using a mask bit array "001000";
when the maximum likelihood bit array includes "100111" or "011000," generating the right shift bit array by using a mask bit array "000100"; and
when the maximum likelihood bit array includes "1110011000" or "0001100111," generating both the left shift bit array by using a mask bit array "0010100000" and the right shift bit array by using a mask bit array "0000010100."

4. A write adjustment method for an optical disc on which information is written by using code with a minimum run length of 2T and from which the information is reproduced by using an adaptive equalization technique and a PR(1,2,2,2,1) ML technique, the method comprising the steps of:
using, as the adaptive equalization technique, a FIR filter with tap coefficients restricted to be centrosymmetric;
obtaining a first binary bit array in such a way that a reproduced signal obtained from the optical disc is binarized in the PR(1,2,2,2,1)ML technique;
generating a second or third binary bit array as a bit array in which an edge of a focused recording mark in the first binary bit array is shifted to the left or right by 1T while limitation on a minimum run length of 2T or longer is satisfied;
generating at least any one of first, second and third target signals corresponding to the first to third binary bit arrays;
calculating at least any one of a first Euclidean distance difference that is a difference between a Euclidean distance between the second target signal and the reproduced signal, and a Euclidean distance between the first target signal and the reproduced signal, and a second Euclidean distance difference that is a difference between a Euclidean distance between the third target signal and the reproduced signal, and the Euclidean distance between the first target signal and the reproduced signal;
calculating, as an evaluation index of the focused recording mark, an edge shift, a length or a position of the focused recording mark by using at least any one of the first Euclidean distance difference and the second Euclidean distance difference, and adjusting a condition for writing the information based on the evaluation index thus calculated;
when the focused recording mark is 2T and follows or is followed by a space of 2T, calculating the evaluation index based on the first and second Euclidean distance differences with both of a Hamming distance between the second and first binary bit arrays and a Hamming distance between the third and first binary bit arrays being 2;
when the focused recording mark is 3T or longer and follows or is followed by a space of 3T or longer, calculating the evaluation index based on the first and second Euclidean distance differences with both of the Hamming distance between the second and first binary bit arrays and the Hamming distance between the third and first binary bit arrays being 1; and
when the focused recording mark is 2T and follows or is followed by a space of 3T or longer, calculating the evaluation index based on the first Euclidean distance difference with the Hamming distance between the second and first binary bit arrays being 1.

* * * * *